United States Patent [19]

Buzio et al.

[11] 4,163,080

[45] Jul. 31, 1979

[54] FLEXIBLE DOUBLE-LAYER POLYPROPYLENE LAMINATES FOR THE PACKAGING OF FOOD PRODUCTS

[75] Inventors: Pierpaolo Buzio, Rho; Lucio Edefonti, Busto Arsizio, both of Italy

[73] Assignee: Societa' Italiana Resine S.I.R. S.p.A., Milan, Italy

[21] Appl. No.: 895,822

[22] Filed: Apr. 13, 1978

[30] Foreign Application Priority Data

Apr. 13, 1977 [IT] Italy .................. 22393-A/77

[51] Int. Cl.$^2$ ............................................. B32B 27/40
[52] U.S. Cl. ................................... 428/424; 156/306; 156/309; 156/331; 426/126; 428/36; 428/516; 428/523; 428/910
[58] Field of Search .............. 428/424, 910, 516, 523, 428/126, 36; 426/126; 156/331, 309, 306

[56] References Cited

U.S. PATENT DOCUMENTS

| | | | |
|---|---|---|---|
| 3,547,682 | 12/1970 | Erb ........................ | 427/409 |
| 3,553,073 | 1/1971 | Rausing ................. | 427/411 |
| 3,666,585 | 5/1972 | Barbehenn ............ | 428/910 |
| 3,695,918 | 10/1972 | Ward ..................... | 428/424 |
| 3,775,549 | 11/1973 | Matsuda ................ | 156/278 |
| 3,862,869 | 1/1975 | Peterson ............... | 428/910 |
| 3,887,755 | 6/1975 | Zammer ................ | 428/424 |
| 3,965,271 | 6/1976 | Harrington ........... | 428/910 |

FOREIGN PATENT DOCUMENTS

| | | | |
|---|---|---|---|
| 766728 | 9/1967 | Canada .................. | 428/910 |
| 1319232 | 6/1973 | United Kingdom ... | 428/910 |
| 1440317 | 6/1973 | United Kingdom ... | 428/910 |

*Primary Examiner*—Ellis P. Robinson
*Attorney, Agent, or Firm*—Sughrue, Rothwell, Mion, Zinn and Macpeak

[57] ABSTRACT

A flexible double-layer polypropylene laminate consisting of a bioriented film consisting essentially of isotactic polypropylene with an atactic polypropylene content of less than 6% by weight and an intrinsic viscosity (standard ASTM D 1601) of from 1.5 to 3.0 dl/g, adhesively bonded with a non-oriented film consisting essentially of a mixture of isotactic polypropylene and atactic polypropylene, the latter in an amount of from 15 to 30% by weight of the total weight of the said mixture, the isotactic polypropylene of said mixture having an intrinsic viscosity (standard ASTM D 1601) of from 1.0 to 1.5 dl/g and the atactic polypropylene of said mixture having a density (standard ASTM D 1505) of from 0.855 to 0.865 g/cm$^3$ and a viscosity at 160° C. of from 3,000 to 10,000 cps.

7 Claims, No Drawings

FLEXIBLE DOUBLE-LAYER POLYPROPYLENE LAMINATES FOR THE PACKAGING OF FOOD PRODUCTS

The present invention relates to flexible double-layer polypropylene laminates for the packaging of food products, and in particular pasta foods.

Recently in the packaging field, especially in the food product sector, the use of laminated films for packaging has been developed more and more.

By laminated films are intended the materials resulting from the lamination of two or more films with different characteristics, which have a combination of the various characteristics of the component films used.

In the field of packaging food products, especially those intended to have a long shelf life, or anyway to be kept for a long time in a warehouse, a whole series of properties are required for the packaging and it is practically impossible to unite these in a single film, especially since very often the required properties are in contradiction with one another.

Thus, for example, for prolonged storage, satisfactory barrier qualities, especially towards gas and steam, and impermeability to grease and smells are required while for good handling qualities of the packages, the possibility of filling while hot, high resistance to damage by knocking and ease of labelling are required.

With the lamination of two or more films with different characteristics, these difficulties can be overcome by the realisation of various combinations of properties, even if in contradiction which one another, which make possible the solution of specific problems in the packaging field.

One of the laminated films more used for the preparation of packagings for food products, particularly for products perishable through the effect of dampness, is the material obtained by laminating a bistretched isotactic polypropylene film with a low density, polyethylene film.

In this material the polyethylene allows the welding and hence the closing of the packages, particularly of envelopes and bags, while the oriented polypropylene film gives mechanical durability and impermeability to steam.

These laminated films, which are non-toxic according to the regulations imposed by the health laws, besides allowing a high degree of protection of the contents, are also advantageous because they are odourless and tasteless, are easily worked and because of their good properties of brilliance and transparency allow the contents to be seen together with the decoration and the printing of the packagings.

The laminated, bistretched isotactic polypropylene/polyethylene films, while being very interesting for the above mentioned properties, have, however, several disadvantages, due above all to the polyethylene component in direct contact with the contents of the packages, which do not make them very suitable for the packaging of pasta foods.

As is known, the production cycle for pasta foods in modern industry provides for the packaging of the pasta to follow immediately after their preparation.

For this reason the pasta foods coming, still hot, from the drying oven are sent to the automatic filling machines which carry out both the formation of the packagings (envelopes, bags and parcels) starting with the laminated film and also their filling and sealing.

The principle of operation of these machines is that of forming from the laminated films a kind of longitudinally-sealed tube; weighed quantities of product are then inserted into the tube to fill parts of the tube between two successive transverse sealings, formed by hot blades or heated bars.

The separation of the filled packages takes place by cutting near the transverse sealing line with a cold blade. Therefore in the case of pasta foods the laminated films require, besides the above characteristics, also good holding of the seals when hot, and furthermore high strength of the said seal when cold.

In particular good holding of the seals when hot allows the filling to be carried out, above all in the case of large quantities of hot products, without giving rise to deformation or worse, opening of the seals with escape and loss of the products.

High strength of the seals allows the packages to bear all the handling which occurs during transport and distribution of the packages without tear and damage of the said seals.

These characteristics are not possessed by bistretched polypropylene/polyethylene laminated films, particularly the polyethylene component.

Furthermore, especially for pasta with pointed shapes, such as spaghetti and short pasta, good resistance to piercing and resistance to abrasion are required for the packages, the first to avoid tearing of the packages and the second to prevent formation of lines and opaqueness which reduce the transparency and shine of the packages.

In the art polyolefin laminates have been considered in which the outer layer always consists of a film of oriented polypropylene, while the inner layer consists of a film produced from a mixture in which low-density polythene is partially or completely substituted by isotactic polypropylene or by ethylene/propylene copolymers which, besides having good characteristics of resistance to piercing and resistance to abrasion also give an improved seal strength.

These laminated films are not, however, completely satisfactory especially with regard to the holding of the seal when hot.

It is possible for example for deformations and ruptures of the seals to occur which are naturally greatly facilitated if the seals themselves are subjected to a high load or to additional thermal action, such as occurs during the packaging of pasta when the seals of the packages are stressed both by the weight and by the heat of the pasta coming from the drying oven.

The object of this invention is to provide laminated films suitable for the packaging of food products, particularly pasta foods, even in pointed shapes, which besides having high resistance to piercing and to abrasion, combine the characteristics of high strength and good holding of the seal when hot.

It has now been found that the achievement of this is possible when a bistretched isotactic polypropylene film is laminated to a non-oriented film prepared from a mixture of isotactic polypropylene and atactic polypropylene, the latter in a quantity of from 15 to 30% by weight of the total weight of the non-oriented film.

This invention relates, therefore, to flexible laminated films for the packaging of food products consisting essentially of:

a bioriented film prepared from isotactic polypropylene with an atactic polypropylene content of less than 6% by weight and a value of the intrinsic viscosity, measured in decalin at 135° C. with an UBBELOHDE viscometer (standard ASTM D 1601), of from 1.5 to 3.0 dl/g;

a non-oriented film prepared from a mixture of isotactic polypropylene and atactic polypropylene, the latter in a quantity of from 15 to 30% by weight of the total weight of the non-oriented film, the said isotactic polypropylene having an intrinsic viscosity (standard ASTM D 1601) within the range of from 1.0 to 1.5 dl/g and the said atactic polypropylene having a density (standard ASTM D 1505) within the range of from 0.855 g/cm$^3$ to 0.865 g/cm$^3$ and a viscosity when fused at 16020 C. determined with a rotational viscometer within the range of from 3,000 to 10,000 cps.

The percentages of atactic are given with reference to the total portions which can be extracted in n-heptane in eight hours of boiling.

The films can be laminated with each other by the conventional method of lamination by adhesive. The adhesive, diluted with solvent, is smeared on the supporting film (isotactic polypropylene) or on both films in quantities (calculated on the dry matter) of from 1.5 to 3 g/m$^2$ of surface.

The solvent evaporates during passage through a hot-air drying tunnel.

The lamination of the films takes place in the passage between two laminating cylinders, heated at the optimal temperature for the tempering of the adhesive and for obtaining the best adhesion, generally at a temperature of from 60° to 80° C.

The surfaces of the films which are made to adhere may be pretreated, before the application of the adhesive, by one of the known methods for increasing the adhesion of components to be laminated, such as treatment with electric discharges emitted by high-frequency generators, flame treatment and chemical treatment.

The adhesive can be of the thermoplastic or thermohardening type; in the latter case it consists, in general, of two components which are mixed together a little before application, as is already known in the art for the preparation of laminates.

Polyurethane adhesives dissolved in organic solvents such as methyl ethyl ketone and ethyl acetate in concentrations of from 15 to 40% by weight can be used with advantage.

The operations of extrusion and stretching of the starting films are carried out according to known processes. The thickness of the films is regulated so that it is within the range of from 20 to 35 microns.

The starting materials may have added to them, before extrusion, additives commonly used in the art of film production, such as stabilizers, lubricants and pigments.

To the mixture of isotactic and atactic polypropylene are added with advantage before extrusion antioxidants chosen from substituted phenols, singly or mixed together, in quantities of from 0.05 to 0.2% by weight and some slip-agents chosen from the amides of saturated or unsaturated fatty acids and aliphatic tertiary amines, either singly or mixed together, in quantities of from 0.05 to 0.2% by weight, preferably mixed with inert fillers such as silica and diatomite in quantities equal to or about equal to those of the amines or amides.

The films laminated according to the present invention are characterized both by a high strength of the seals when cold and also good holding of the said seals when hot.

Without wishing in any way to be tied to a theory, we think that these characteristics are closely dependent on the fact that the sealing is due in a particular way to the presence of the atactic poplypropylene in the non-oriented film.

As is known, the principle on which the process of heat sealing of films is based consists of heating the contact surfaces by suitable means to a temperature sufficient to induce satisfactory softening of the material. The softened parts are at the same time pressed together so as to diffuse mutually one into the other creating an homogeneous whole which, when solidified constitutes, in practice, the seal.

It is thought therefore, that one of the most important phenomena which gives rise to the sealing is the capacity of the softened polymer to diffuse in the contact area, which capacity is directly proportional to the degree of fluidity of the polymer itself.

Furthermore, of great importance to the sealing, above all in respect of the holding when hot, is the speed of the solidification, which depends both on the quantity of the material involved and on the required temperature change.

The quicker the speed of solidification the greater is the holding of the seal when hot.

At the temperature indicated for sealing, the capacity of atactic polypropylene for diffusion is very high so that even reduced quantities, such as those illustrated, are able to guarantee a high-strength seal.

The reduced quantity of material involved in the solidification and moreover the small temperature change necessary for the solidification of atactic polypropylene guarantee for the latter a high speed of solification and therefore a good holding of the seal when hot.

These characteristics shown by the atactic polypropylene are not found, or are found in a very reduced measure, with polythene, isotactic polypropylene and ethylene/propylene copolymers.

It is to be noted furthermore that for laminated films in which the concentration of the atactic polypropylene is less than 15% by weight of the total weight of the non-oriented film too high sealing temperatures are needed which lead to weakening and wrinkling of the outer, oriented polypropylene film. On the other hand, concentrations of atactic polypropylene greater than 30% cause exudation in the laminated film which deleteriously affect the slipability and the quality of the film.

The good properties of holding when hot and strength when cold of the seal, together with the high resistance of piercing and to abrasion and also, at the same time, characteristics of non-toxicity, of barrier to steam and excellent brilliance and transparency, allow the laminated films of the present invention to be used advantageously in the packaging of food products, particularly pasta foods.

This invention will now be illustrated by the following Examples which do not, however, limit its scope in any way.

EXAMPLE 1

A film was prepared from an isotactic polypropylene with an atactic percentage of less than 5% and with an intrinsic viscosity of 2.3 dl/g.

For this purpose the molten polymer was extruded through a straight slit which ensures that the film obtained has a thickness of 30 microns. After cooling the film by contact with rollers having jackets with an internal water circulation the film was stretched longitudinally by a series of rotating rollers of different speeds and transversally in a machine of the "rameuse" type such that the bioriented film had a longitudinal tensile strength of 11 Kg/mm$^2$ and a transverse tensile strength of 22 Kg/mm$^2$ (standard ASTM D 882).

The bistretched film was then smeared with about 3 g/m$^2$ (drymatter) of UNOFLEX polyurethane adhesive made by the POLYMER INDUSTRIES Company, in 25% solution in methy ethyl ketone, by means of a system of rollers dipping into a basin containing the said adhesive. The smeared film was then passed through a hot tunnel to evaporate the solvent.

At the same time, a non-oriented film was prepared by the same method as used above, starting with a mixture of isotactic polypropylene having an intrinsic viscosity of 1.3 dl/g and atactic polypropylene having a density of 0.857 g/cm$^3$ and a viscosity of 6000 cps at 160° C., the latter being present in such a quantity that the atactic polypropylene content of the non-oriented film was equal to 15% by weight.

The EAST BOND product M-5 W of Eastman Kodak was used as the atactic polypropylene.

To the mixture was also added about 0.1 parts for every 100 parts by weight of the mixture of the antioxidant product IRGANOX 1076 of the CIBA Company together with about 0.2 parts for every 100 parts by weight of the said mixture of the slip-agent ARMID O made by the AKZO Company (mixture of oleamide and palmitamide) and about 0.1 parts for every 100 parts by weight of the said mixture of SYLOID 244 (synthetic silica) made by the GRACE Company.

The final non-oriented film has a modulus of elasticity (standard ASTM D 882) of 55 Kg/mm$^2$, a density of 0.895 g/cm$^3$ (standard ASTM D 1505) a coefficient of static friction (SLIP) (standard ATSSM D 1694) of 0.46 and a transparency (HAZE) (standard ASTM D 1003) of 2.5.

The lamination of this non-oriented film with the bioriented film was carried out in the passage between two laminating cylinders heated to 70° C.

The laminated film thus obtained had a thickness of about 55 micron and showed the characteristics illustrated in the following Table 1.

EXAMPLE 2

The test of Example 1 was repeated, the composition of the mixture used in the preparation of the non-oriented film being modified. More precisely such a quantity of atactic polypropylene was used that the atactic polypropylene content of the non-oriented film was equal to 20% by weight. The final non-oriented film had the following properties: modulus of elasticity of 50 Kg/mm$^2$, coefficient of static friction of 0.45 (SLIP) and transparency (HAZE) of 2.5.

The lamination of this non-oriented film with the bioriented film as in Example 1 resulted in a laminated film with a thickness of about 55 micron which showed the characteristics illustrated in the following Table 1.

EXAMPLE 3

The test of Example 1 was again repeated, a quantity of atactic polypropylene being used in the preparation of the non-oriented film however such that the content of atactic polypropylene in the non-oriented film was equal to 25% by weight. The final non-oriented film had the following properties: modulus of elasticity of 50 Kg/mm$^2$, coefficient of static friction of 0.45 and transparency (HAZE) of 2.5.

The laminated films obtained after lamination with the bioriented film as in the Example 1 had a thickness of about 55 micron and had the characteristics illustrated in the following Table 1.

EXAMPLE 4 (Comparative)

The test of Example 1 was repeated, the composition of the mixture used in the preparation of the non-oriented film being modified. More precisely, a quantity of atactic polypropylene was used such that the atactic polypropylene content of the non-oriented film was equal to 10% by weight. The final non-oriented film had the following properties: modulus of elasticity equal to 70 Kg/mm$^2$, coefficient of static friction of 0.40 and transparency (HAZE) of 3.

The lamination of this non-oriented film as in Example 1 resulted in a laminated film with a thickness of about 55 micron which had the characteristics illustrated in the following Table 1.

TABLE 1

| | | Characteristics of the laminated films | | | | |
|---|---|---|---|---|---|---|
| % ATACTIC | RESISTANCE to puncture (1) | RESISTANCE to abrasion in cycles (2) | HOLDING OF THE WELD WHEN HOT in g/cm at 140° C. (3) | STRENGTH OF THE WELD AT ROOM TEMPERATURE | | |
| | | | | 135° C. | 140° C. in g/cm (4) | 145° C. |
| 10% | 1200 | 50 | — | — | — | 400 |
| 15% | 1500 | 50 | 60 | — | 300 | 1000 |
| 20% | 1500 | 50 | 80 | 200 | 500 | 1000 |
| 25% | 1500 | 50 | 100 | 300 | 1000 | 1000 |

(1) Determined on the basis of the standard ASTM D 2582.
(2) Determined on the basis of the standard ASTM D 1044.
(3) The determination of the holding of the weld when hot is carried out at 140° C. using calibrated springs of steel sheet. In practice this is carried out in the following way: a ring is formed from a strip of the material to be subjected to the test, the edges necessary to weld it being left outside. A steel sheet, folded on itself, (spring) is inserted into the ring with its free ends near to the point at which the welding of the material must be carried out. In this way, as soon as the sealing bars open, the tendency of the spring to straighten itself exercises a certain force which tends to tear the newly formed weld.
(4) The strength of the weld "when cold" (at room temperature) is determined on welds formed at 135° C. 140° C. and 145° C. respectively with a SENTINEL welder with a contact time equal to 1 second and a pressure equal to 2.5 Kg/cm$^2$. In practice this is carried out in the following way: after the welding of the laminated film has been effected, a test piece of width equal to 1 cm is cut and the rupture resistance of the weld is evaluated by means of an INSTRON dynamometer.

We claim:
1. A flexible double-layer polypropylene laminate consisting essentially of a biaxially oriented film consisting essentially of isotactic polypropylene with an atactic polypropylene content of less than 6% by weight and an intrinsic viscosity, measured in decalin at 135° C. with an UBBELOHDE viscometer (standard ASTM D 1601), of from 1.5 to 3.0 dl/g, adhesively bonded with a non-oriented film consisting essentially of a mixture of isotactic polypropylene and atactic polypropylene, the latter in an amount of from 15 to 30% by weight of the total weight of the said mixture, the said isotactic polypropylene of said mixture having an intrinsic viscosity (standard ASTM D 1601) of from 1.0 to 1.5 dl/g and the said atactic polypropylene of said mixture having a density (standard ASTM D 1505) of from 0.855 to 0.865 g/cm$^3$ and a viscosity when fused at 160° C., determined with a rotational viscometer, of from 3,000 to 10,000 cps.

2. The laminate of claim 1, wherein an adhesive is interposed between the biaxially oriented film and the non-oriented film in a quantity of from 1.5 to 3 g per m$^2$ of surface.

3. The laminate of claim 2, wherein a polyurethane adhesive is used as the adhesive.

4. A process for producing a flexible double-layer plastic laminate, which comprises preparing a biaxially oriented film consisting essentially of isotactic polypropylene with an atactic polypropylene content of less than 6% by weight and an intrinsic viscosity of from 1.5 to 3.0 dl/g, as measured at 135° C. in decalin with an UBBELHODE viscometer (standard ASTM D 1601), and a non-oriented film consisting essentially of a mixture of isotactic polypropylene and atactic polypropylene, the latter being present in the mixture in an amount of from 15 to 30% by weight, said isotactic polypropylene of said mixture having an intrinsic viscosity (standard ASTM D 1601) of from 1.0 to 1.5 dl/g and said atactic polypropylene of said mixture having a density (standard ASTM D 1505) of from 0.855 to 0.865 g/cm$^3$ and a viscosity when fused at 160° C., determined with a rotational viscometer, of from 3,000 to 10,000 cps, applying on to at least one of the surfaces to be bonded of said films an adhesive in an amount of from 1.5 to 3 g per m$^2$ of surface, and laminating the said films at a temperature of from 60° to 80° C.

5. The process of claim 4, wherein the biaxially oriented film and the non-oriented film have a thickness of from 20 to 35 microns.

6. The laminate of claim 1, wherein said laminate is heat-sealed, thereby providing high seal strength when the laminate is cooled and good seal holding when the laminate is hot.

7. The process of claim 4, wherein said laminating at a temperature of from 60° to 80° C. results in heat-sealing, thereby providing high seal strength when the laminate is cold and good seal holding when the laminate is hot.

* * * * *